United States Patent
Chu

(10) Patent No.: US 11,590,963 B2
(45) Date of Patent: Feb. 28, 2023

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Sanguk Chu, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 154 days.

(21) Appl. No.: 16/800,863

(22) Filed: Feb. 25, 2020

(65) Prior Publication Data

US 2021/0129833 A1   May 6, 2021

(30) Foreign Application Priority Data

Oct. 31, 2019   (KR) .................. 10-2019-0137731

(51) Int. Cl.
| | |
|---|---|
| *B60W 30/06* | (2006.01) |
| *B60W 60/00* | (2020.01) |
| *B60W 10/184* | (2012.01) |
| *B60W 30/08* | (2012.01) |

(52) U.S. Cl.
CPC .......... *B60W 30/06* (2013.01); *B60W 10/184* (2013.01); *B60W 60/0011* (2020.02); *B60W 2030/082* (2013.01); *B60W 2554/20* (2020.02)

(58) Field of Classification Search
CPC ........................ B60W 30/12; B60W 60/0011
See application file for complete search history.

(56) References Cited

U.S. PATENT DOCUMENTS

| | | | | |
|---|---|---|---|---|
| 11,247,661 | B2 * | 2/2022 | Miwa | B60K 6/547 |
| 2013/0218412 | A1 * | 8/2013 | Ricci | G06F 11/2025 |
| | | | | 701/36 |
| 2014/0187219 | A1 * | 7/2014 | Yang | H04W 4/023 |
| | | | | 455/418 |
| 2017/0113686 | A1 * | 4/2017 | Horita | B60W 30/18163 |
| 2018/0015830 | A1 * | 1/2018 | Brouwer | B60T 8/321 |
| 2018/0082588 | A1 * | 3/2018 | Hoffman, Jr. | G08G 1/166 |
| 2018/0111608 | A1 * | 4/2018 | Kim | B60W 10/06 |
| 2019/0061740 | A1 * | 2/2019 | Ohira | B60W 30/06 |
| 2019/0101917 | A1 * | 4/2019 | Yao | B60W 50/14 |
| 2019/0232974 | A1 * | 8/2019 | Reiley | G06V 20/597 |
| 2019/0283737 | A1 * | 9/2019 | Sugano | G06F 3/16 |
| 2020/0339159 | A1 * | 10/2020 | Zhong | G01C 21/3484 |
| 2020/0398822 | A1 * | 12/2020 | Hara | B60W 30/09 |
| 2021/0031752 | A1 * | 2/2021 | Choi | B60W 40/105 |

(Continued)

FOREIGN PATENT DOCUMENTS

KR   10-1998-0054228 A   9/1998

*Primary Examiner* — Jess Whittington
(74) *Attorney, Agent, or Firm* — Slater Matsil, LLP

(57) ABSTRACT

A vehicle includes a brake device; a storage configured to store a first setting value and a second setting value having a smaller magnitude than the first setting value; a communicator configured to receive an automatic parking signal; a detector configured to detect at least one of an object or whether the vehicle is in contact with the object; and a controller configured to control the brake device based on a detection result of the detector and the first setting value, and to control the brake device based on the detection result and the second setting value when the automatic parking signal is received.

20 Claims, 7 Drawing Sheets

(56) References Cited

U.S. PATENT DOCUMENTS

| | | | |
|---|---|---|---|
| 2021/0163068 A1* | 6/2021 | Zhu .................... | B62D 15/0285 |
| 2021/0213941 A1* | 7/2021 | Fukasawa ............. | B60W 30/09 |
| 2021/0221357 A1* | 7/2021 | Woolliscroft .......... | G08G 1/168 |
| 2021/0245734 A1* | 8/2021 | Harai ................. | B62D 15/0285 |

* cited by examiner

VEHICLE AND METHOD OF CONTROLLING THE SAME

CROSS-REFERENCE TO RELATED APPLICATION

The present application claims priority to and the benefit of Korean Patent Application No. 10-2019-0137731, filed on Oct. 31, 2019, which is incorporated herein by reference in its entirety.

TECHNICAL FIELD

The disclosure relates to a vehicle and a method of controlling the vehicle, and more particularly, to a vehicle including an automatic parking function, and a method of controlling the vehicle.

BACKGROUND

The statements in this section merely provide background information related to the present disclosure and may not constitute prior art.

In recent years, a vehicle including an automatic parking function has been developed as a technology for convenient driver parking.

Particularly, in order to park conveniently in a space where it is difficult for a user to get on and off, a conventional vehicle utilizes a control of the vehicle technology through a rear camera, an ultrasonic sensor, and a smart key.

However, according to a conventional automatic parking method, there is an area where the rear camera and the ultrasonic sensor cannot be detected, and when the rear camera or the ultrasonic sensor malfunctions, there is a problem that a safe parking cannot be performed.

SUMMARY

Therefore, it is an aspect of the disclosure to provide a vehicle capable of setting parameters related to parking mode entry conditions and a parking mode.

In detail, the parameter related to the parking mode may finely detect and control the vehicle approach and contact of an object, and the vehicle may significantly lower the probability of a contact accident while parking.

Additional aspects of the disclosure will be set forth in part in the description which follows and, in part, will be obvious from the description, or may be learned by practice of the disclosure.

In accordance with an aspect of the disclosure, a vehicle includes a brake device; a storage configured to store a first setting value and a second setting value having a smaller magnitude than the first setting value; a communicator configured to receive an automatic parking signal; a detector configured to detect at least one of whether the object or the vehicle is in contact with the object; and a controller configured to control the brake device based on the detection result of the detector and the first setting value, and to control the brake device based on the detection result and the second setting value when the automatic parking signal is input.

The controller may be configured to determine whether the object is in contact with the vehicle, and to control the brake device based on the determination result.

The controller may be configured to determine the second setting value and a relative acceleration of the vehicle approaching the object based on the communication result of the communicator.

The vehicle may further include a sensor device configured to detect whether a passenger is present in the vehicle. The controller may be configured to determine the second setting value and a relative acceleration of the vehicle approaching the object based on the detection result of the sensor device.

The controller may be configured to determine whether the object approaches a lower part of the vehicle, and to control the brake device based on the determination result.

The controller may be configured to determine whether an external object is in contact with the lower part of the vehicle, and to control the brake device and the driving device based on the determination result.

The vehicle may further include an airbag control unit (ACU). The ACU may include a detector. The controller may be configured to receive the detection result of the detector, and to control the driving device and the brake device based on the received detection result.

The vehicle may further include an inputter configured to receive at least one of the first setting value or the second setting value. The controller may be configured to control at least one of the driving device or the brake device based on setting values input to the inputter.

The controller may be configured to determine whether parking of the vehicle is terminated, and to terminate communication with the communicator based on the determination result.

The controller may be configured to learn a parking state of the vehicle by deep learning.

In accordance with another aspect of the disclosure, a method of controlling a vehicle includes storing, by a storage, a first setting value and a second setting value having a smaller magnitude than the first setting value; receiving, by a communicator, an automatic parking signal; detecting, by a detector, at least one of whether the object or the vehicle is in contact with the object; and controlling, by a controller, the brake device based on the detection result and the first setting value, and controlling the brake device based on the detection result and the second setting value when the automatic parking signal is input.

The controlling may include determining whether the object is in contact with the vehicle, and controlling the brake device based on the determination result.

The controlling may include determining the second setting value and a relative acceleration of the vehicle approaching the object based on the communication result of the automatic parking signal.

The method may further include detecting, by a sensor device, whether a passenger is present in the vehicle. The controlling may include determining the second setting value and a relative acceleration of the vehicle approaching the object based on the detection result of the sensor device.

The controlling may include determining whether the object approaches a lower part of the vehicle, and controlling the brake device based on the determination result.

The controlling may include determining whether an external object is in contact with the lower part of the vehicle, and controlling the brake device and the driving device based on the determination result.

The controlling may include receiving the detection result from the detector included in an airbag control unit (ACU), and controlling the driving device and the brake device based on the received detection result.

The method may further include receiving, by an inputter, at least one of the first setting value or the second setting value. The controlling may include controlling at least one of the driving device or the brake device based on setting values input to the inputter.

The controlling may include determining whether parking of the vehicle is terminated, and terminating communication of the automatic parking signal based on the determination result.

The controlling may include learning a parking state of the vehicle by deep learning.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
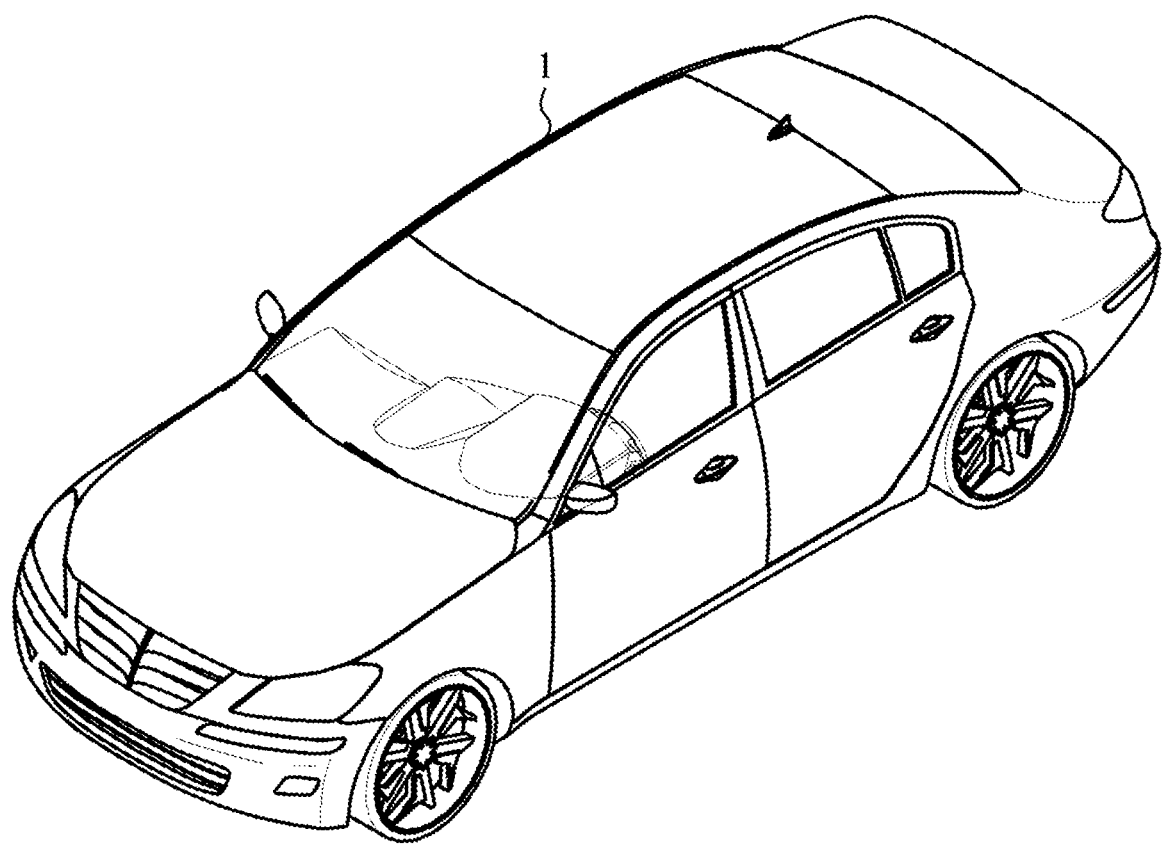
FIG. 1 is a view illustrating a vehicle in one form of the disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. Not all elements of forms of the disclosure will be described, and description of what are commonly known in the art or what overlap each other in the forms will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and some forms of the disclosure will now be described with reference to the accompanying drawings.

Figure 2:
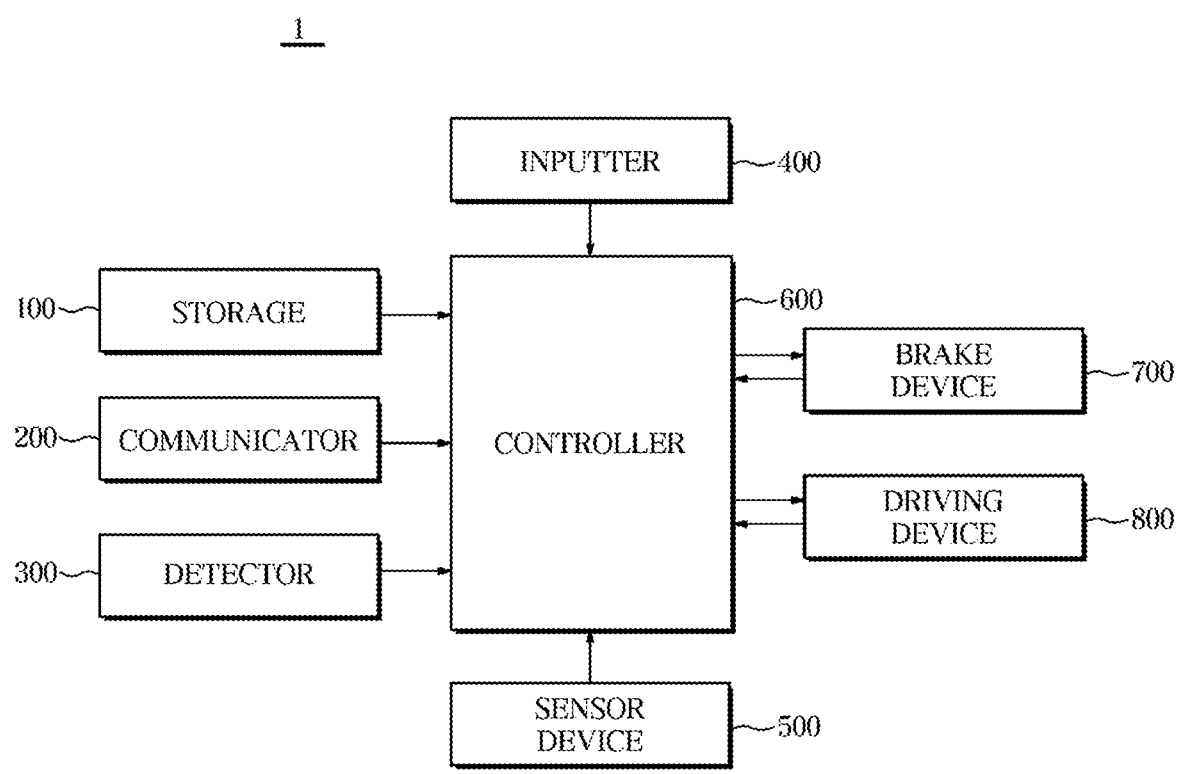
FIG. 2 is a control block diagram of a vehicle in one form of the disclosure.

FIG. 1 is a view illustrating a vehicle in some forms of the disclosure, and FIG. 2 is a control block diagram of a vehicle in some forms of the disclosure.

Referring to FIGS. 1 and 2, a vehicle 1 may include a storage 100, a communicator 200, a detector 300, an inputter 400, a sensor device 500, a controller 600, a brake device 700, and a driving device 800.

The storage 100 stores a first setting value and a second setting value.

Particularly, the first setting value may refer to a relative acceleration threshold value of an object with respect to the vehicle 1 when the vehicle 1 is in a normal driving state. As will be described later in FIG. 3, when it is determined that the vehicle 1 is in the normal driving state, the controller 600 may compare a relative acceleration magnitude and the first setting value of the object with respect to the vehicle 1, and control the vehicle 1 based on the comparison result.

The second setting value may refer to a relative acceleration threshold value of the object with respect to the vehicle 1 when the vehicle 1 is in a parking mode. The second setting value is smaller than the first setting value. As will be described later in FIG. 3, when it is determined that the vehicle 1 is in the parking mode, the controller 600 may compare the relative acceleration magnitude and the second setting value of the object with respect to the vehicle 1, and control the vehicle 1 based on the comparison result.

Here, the first setting value and the second setting value are values that can be changed according to user definition.

Meanwhile, the storage 100 may be implemented with at least one of a non-volatile memory device, such as a cache, Read Only Memory (ROM), Programmable ROM (PROM), Erasable Programmable ROM (EPROM), and Electrically Erasable Programmable ROM (EEPROM), a volatile memory device, such as Random Access Memory (RAM), or a storage medium, such as Hard Disk Drive (HDD) and Compact Disk (CD) ROM, without being limited thereto. The storage 100 may be the memory implemented as a chip separate from the processor associated with the controller 600, and may be implemented as the single chip with the processor.

The communicator 200 may transmit and receive a signal between the vehicle 1 and a user terminal. Particularly, the communicator 200 may be provided inside the vehicle 1 or may be provided in the user terminal such as a navigation device existing outside the vehicle 1.

In particular, the communicator 200 may receive an automatic parking signal with the user terminal, and transmit a signal related to an automatic parking to the user terminal with respect to the received signal. The automatic parking signal may include a remote parking signal of the vehicle 1.

The user terminal may be implemented as a computer or a portable terminal capable of connecting to the vehicle 1 through a network. The computer may include, for example, a notebook, a desktop, a laptop, a tablet PC, a slate PC, and the like, each of which is equipped with a WEB Browser. The user terminal may include, for example, a wearable device such as a Personal Communication System (PCS), or the like as a wireless communication device that is guaranteed to be portable and mobile. The portable terminal may be any type of handheld-based wireless communication device such as a Personal Communication System (PCS), Global System for Mobile communications (GSM), Personal Digital Cellular (PDC), Personal Handyphone System (PHS), Personal Digital Assistant (PDA), International Mobile Telecommunications (IMT)-2000, Code Division Multiple Access (CDMA)-2000, W-Code Division Multiple Access (W-CDMA), Wireless Broadband (WiBro) Internet terminal, a vehicle smart key, a smart phone, etc., a wearable device such as a watch, a ring, a bracelet, an anklet, a necklace, a pair of glasses, and contact lens, or a head-mounted-device (HMD).

The communicator 200 may include one or more components that enable communication with an external device, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

The wireless communication module may include a wireless communication interface including an antenna and a transmitter for transmitting the automatic parking signal. The wireless communication module may further include a signal conversion module for converting a digital control signal output from the controller 600 through the wireless communication interface to an analog wireless signal under the control of the controller 600.

The wireless communication module may include a wireless communication interface including an antenna and a receiver for receiving the automatic parking signal. The wireless communication module may further include a signal conversion module for converting an analog wireless signal received through the wireless communication interface to a digital control signal.

The detector 300 may detect at least one of contact with the object or the object of the vehicle 1.

In detail, the detector 300 may detect the object approaching the vehicle 1, and transmit a detection result to the controller 600.

In addition, the detector 300 may detect a type of the object. In some forms of the present disclosure, the detector 300 may detect a moving object such as a pedestrian, a bicycle, another vehicle or a motorcycle. Further, the detector 300 may detect the object approaching a lower part of the vehicle 1 such as a speed bump. The detector 300 may detect a stationary object such as a road separator, another stationary vehicle, and the like.

However, the object that can be detected by the detector 300 is not limited thereto, and may further include other objects that can affect the parking of the vehicle 1 according to a parking state learning of the controller 600 as described below.

In addition, the detector 300 may include a plurality of sensors capable of detecting the periphery of the vehicle 1. In more particular, the detector 300 may include a radar sensor, a light detection and ranging (LiDAR) sensor, an ultrasonic sensor, and an image sensor. However, the sensors included in the detector 300 are not limited thereto, and may include another sensor capable of detecting the object around the vehicle 1.

In addition, the detector 300 may include a rear camera, a front camera, or an imaging camera. However, the cameras included in the detector 300 are not limited thereto, and may further include a camera capable of capturing the periphery of the vehicle 1.

The vehicle 1 may include an airbag control unit (ACU), and ACU may include the detector 300. In detail, the detector 300 included in the ACU may communicate the detection result with the controller 600.

The inputter 400 may receive at least one of the first setting value or the second setting value from the user. In addition, the inputter 400 may transmit at least one of the input first setting value or the second setting value to the controller 600. Further, a function of the inputter 600 may be performed in the controller 600.

In some forms of the present disclosure, the inputter 400 may receive at least one of the first setting value or the second setting value from the user, and the controller 600 may change an existing setting value based on the input first setting value or the second setting value.

The sensor device 500 may detect whether a passenger is present in the vehicle 1.

In particular, the sensor device 500 may detect whether the passenger is present in the vehicle 1 and the number of passengers present in the vehicle 1. The sensor device 500 may include a weight sensor, a pressure sensor, a temperature sensor, an object sensor, or a camera capturing the inside of the vehicle 1. However, this is only a form of the sensor device 500, and the sensor device 500 may include other devices for detecting the inside of the vehicle 1 in addition to the sensor or the camera.

The controller 600 may control the brake device 700 based on the detection result of the detector 300 and the first setting value, and when the automatic parking signal is input from the user, the controller 600 may control the brake device 700 based on the detection result of the detector 300 and the second setting value.

The controller 600 may control the brake device 700 provided in the vehicle 1 based on the first setting value in a normal mode. Here, the first setting value may refer to the relative acceleration threshold value of the object with respect to the vehicle 1 in the normal driving state. In addition, the normal driving state may refer that a mode of the vehicle 1 is not the parking mode.

The controller 600 may control the brake device 700 provided in the vehicle 1 based on the second setting value in the parking mode. Here, the second setting value may refer to the relative acceleration threshold value of the object with respect to the vehicle 1 in the parking mode.

The controller 600 may recognize that the vehicle 1 is in the parking mode when the automatic parking signal is input from the user terminal. In addition, even if the automatic parking signal is not input from the user terminal, when it is determined that the vehicle 1 has entered a parking lot based on the detection result of the detector 300, the controller 600 may determine that the vehicle 1 is in the parking mode. In addition, when the user manually inputs a parking mode entry command, the controller 600 may recognize that the vehicle 1 is in the parking mode even if there is no the automatic parking signal.

In addition, the controller 600 may determine whether the object is in contact with the vehicle 1, and control the brake device 700 of the vehicle 1 based on the determination result.

The controller 600 may determine whether the object approaches the lower part of the vehicle 1 and control the brake device 700 of the vehicle 1 based on the determination result. The controller 600 may determine whether the object is in contact with a tire of the vehicle 1 and control the brake device 700 of the vehicle 1 based on the determination result.

Here, the object may include all elements that can affect the parking of the vehicle 1. Thus, the object may include the stationary object such as surrounding vehicles, the road separator, a parking line, a stone, a sidewalk or a glass bottle. The object may also include an object approaching the lower part of the vehicle 1. Particularly, the object may be an object approaching the lower part of the vehicle 1 such as the speed bump or a stop jaw.

The controller 600 may determine whether an external obstacle approaches the vehicle 1 or the lower part of the vehicle 1, and may control the brake device 700 or the driving device 800 based on the determination result.

In detail, the controller 600 may determine whether the object is the speed bump, and control the driving device 800 to decelerate the vehicle 1 based on the determination result. However, the object is not limited thereto, and may include other elements that can affect the parking or driving of the vehicle 1.

The object may also include the moving object such as the surrounding vehicles, the pedestrian, the bicycle, the motorcycle or a shopping cart. However, the moving object is not limited thereto and may include other elements that can affect the parking or driving of the vehicle 1.

The controller 600 may determine the second setting value and the relative acceleration of the vehicle 1 approaching the object based on a communication result of the communicator 200.

Particularly, when it is determined that the automatic parking signal is input from the user based on the communication result of the communicator 200, the controller 600 may control the vehicle 1 based on the second setting value.

In addition, the controller 600 may determine whether the parking of the vehicle 1 is terminated and terminate communication with the communicator 200 based on the determination result.

The controller 600 may learn the parking state of the vehicle 1 by deep learning. The process of the controller 600 learning the parking state of the vehicle 1 will be described later with reference to FIG. 5.

The controller 600 may be implemented with a memory storing an algorithm to control operation of the components in the vehicle 1 or data about a program that implements the algorithm, and a processor carrying out the aforementioned operation using the data stored in the memory. The memory and the processor may be implemented in separate chips. Alternatively, the memory and the processor may be implemented in a single chip.

The vehicle 1 is basically equipped with ACU and ESC functions. In addition, the vehicle 1 may include the brake device 700 and the driving device 800.

In detail, the driving device 800 may include an engine of the vehicle 1, a steering wheel that interlocks with the engine and adjusts the steering of the vehicle 1, or a wheel of the vehicle 1. However, the driving device 800 is not limited thereto and may include other factors that can affect the driving of the vehicle 1.

The brake device 700 may include a brake that controls a braking force of the vehicle 1, an ABS system or a parking brake. However, the brake device 700 is not limited thereto and may include other elements that can affect the braking force of the vehicle 1.

Hereinafter, a process in which the controller 600 controls the devices provided in the vehicle 1 will be described.

Figure 3:
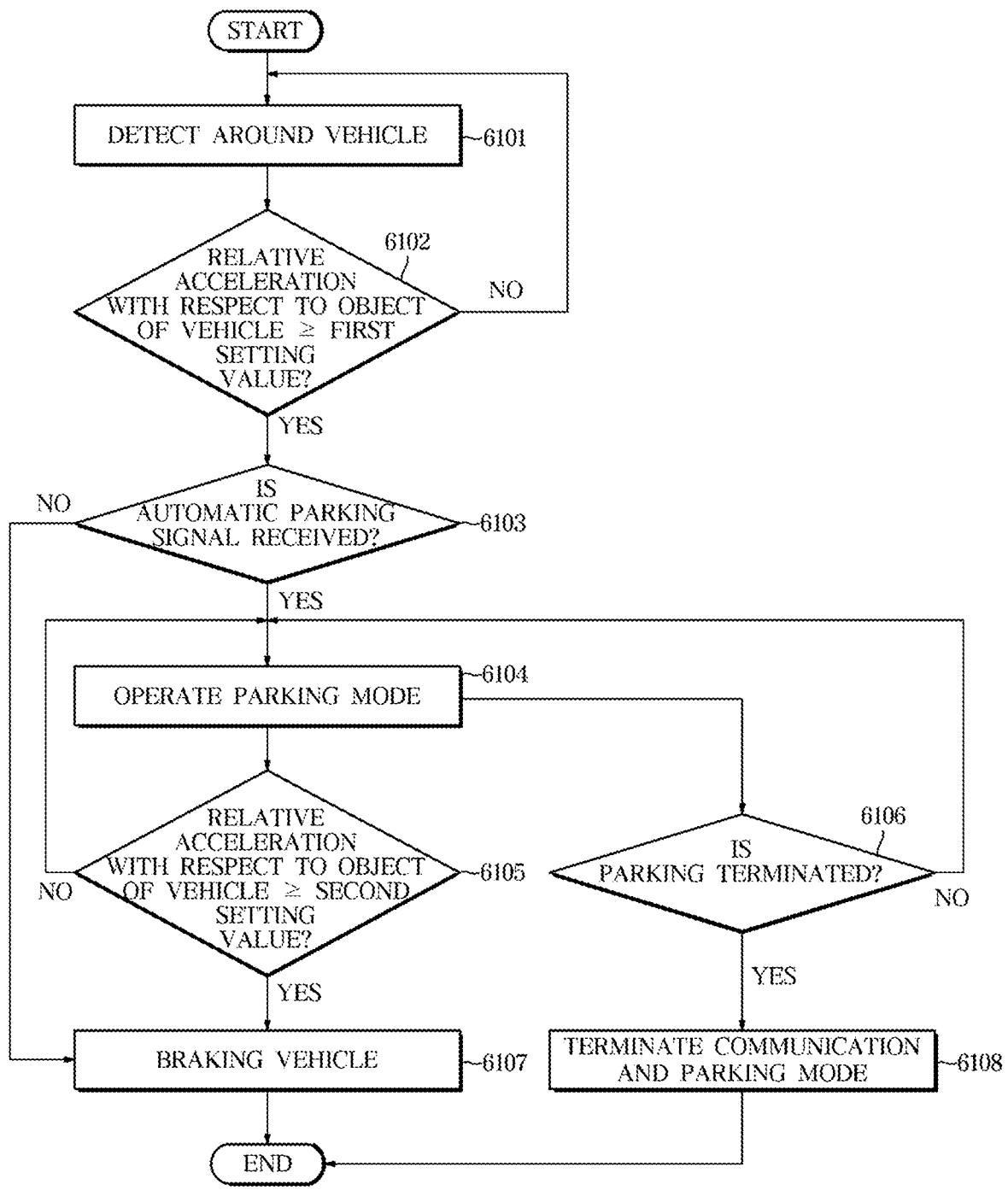
FIG. 3 is a view illustrating a control process of a controller in one form of the disclosure.

FIG. 3 illustrates that the vehicle 1 enters the parking mode and the controller 600 controls the brake device 700 of the vehicle 1.

The detector 300 may detect the object around the vehicle 1 and transmit the detection result to the controller 600 (6101).

The vehicle 1 may compare the relative acceleration with respect to the object of the vehicle 1 and the preset first setting value in the normal mode (6102).

In detail, when it is determined that the vehicle 1 is not in the parking mode, the controller 600 may continuously detect around the vehicle 1.

The controller 600 may determine whether the automatic parking signal is input from the user (6103).

In detail, the controller 600 may enter the vehicle 1 into the parking mode based on the communication result of the communicator 300 or whether the user manually inputs an automatic parking command (6104).

However, when it is determined that no the automatic parking signal is received or no the automatic parking command is input, the controller 600 may continuously detect the periphery of the vehicle 1.

When it is determined that the vehicle 1 is in the parking mode, the controller 600 may compare the relative acceleration of the object of the vehicle 1 with the preset second setting value (6105).

Particularly, when it is determined that the relative acceleration value for the object of the vehicle 1 is greater than or equal to the second setting value, the controller 600 may control the brake device 700 to brake the vehicle 1 (6107). However, when the relative acceleration value for the object of the vehicle 1 is determined to be smaller than the second setting value, the controller 600 may continuously determine whether the vehicle 1 is in a risk of collision with the object in the parking mode.

Here, the second setting value is the value having a smaller magnitude than the first setting value. In detail, when the vehicle 1 enters the parking mode, the controller 600 may control the vehicle 1 based on the second set value and detect even a smaller collision or a smaller collision threat than the normal mode based on the control result.

The controller 600 may determine whether the parking of the vehicle 1 is terminated (6106).

Particularly, the controller 600 may determine whether the parking is terminated, based on whether the vehicle 1 is turned off, whether the user has exited the parking mode manually or by voice, whether the user has applied the parking brake, or whether there is no movement of the vehicle 1 for a preset time. However, a condition that the controller 600 determines whether the parking mode is terminated is not limited thereto and may further include another parking exit signal.

When it is determined that parking of the vehicle 1 is terminated, the controller 600 may terminate the communication with the communicator 200 and the parking mode (6108). However, when it is determined that the parking of the vehicle 1 is not terminated, the controller 600 may continuously control the vehicle 1 in the parking mode.

Figure 4:
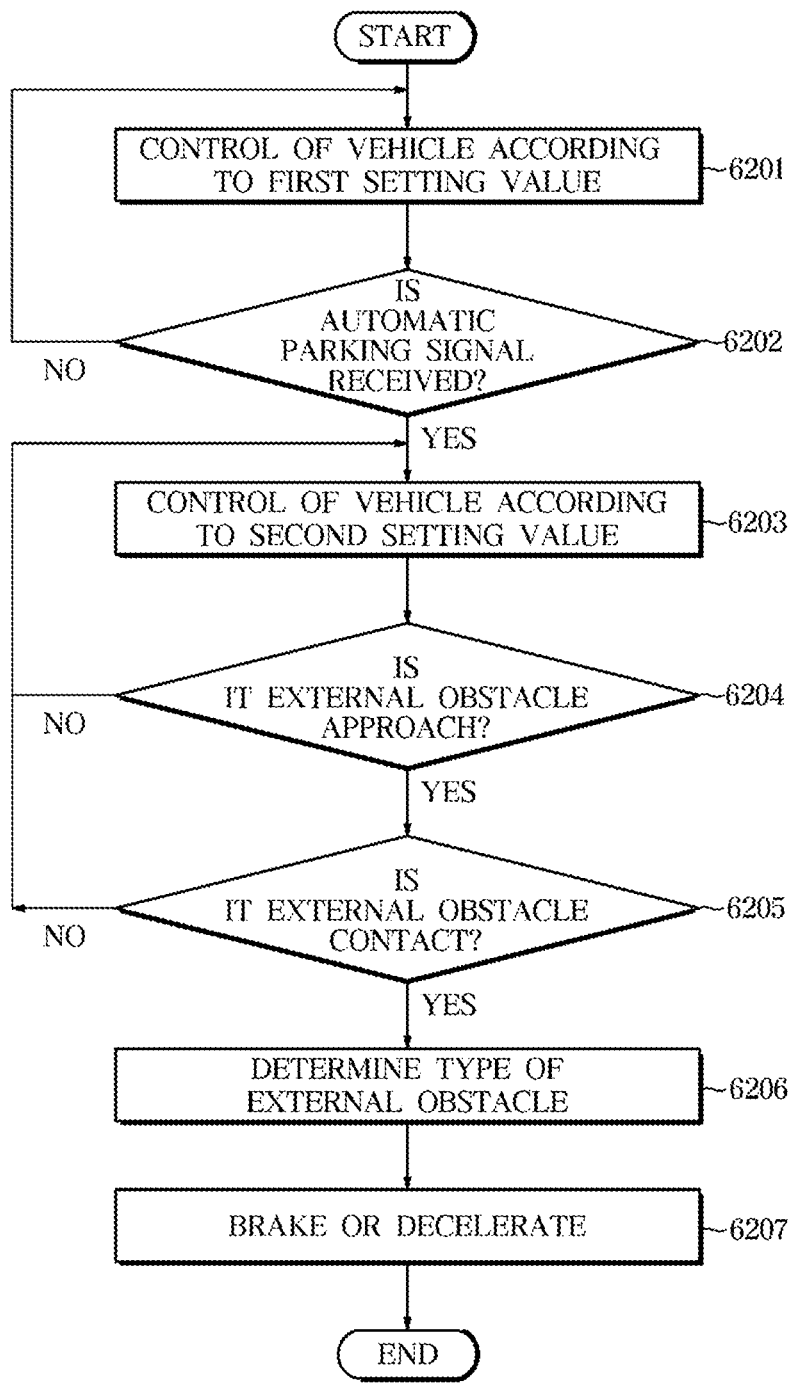
FIG. 4 is a view illustrating a control process of a controller in one form of the disclosure.

FIG. 4 illustrates a process in which the controller 600 determines whether the vehicle 1 contacts the external obstacle and controls the devices of the vehicle 1 based on the determination result.

Referring to FIG. 4, the controller 600 may perform control of the vehicle 1 according to the first setting value in the normal driving mode (6201).

The controller 600 may determine whether the communicator 200 has received the automatic parking signal (6202).

When the communicator 200 determines that the automatic parking signal has been received, the controller 600 may start control of the vehicle 1 according to the second setting value (6203). As described above, the second setting value is the value having a smaller magnitude than the first setting value. In detail, when the vehicle 1 enters the parking mode, the controller 600 may control the vehicle 1 based on the second set value and detect even the smaller collision or the smaller collision threat than the normal mode based on the control result. However, when it is determined that the automatic parking signal is not received, the controller 600 may continuously perform the control of the vehicle 1 according to the first setting value.

The controller 600 may determine whether the external obstacle approaches the vehicle 1, and further determine whether the external obstacle is in contact with the vehicle 1 (6204, 6205).

Particularly, the external obstacle may be the stationary obstacle such as the speed bump, the road separator or the stop jaw. In addition, the external obstacle may be a moving obstacle such as the shopping cart, the bicycle or the pedestrian. However, the external obstacle is not limited thereto, and may include other obstacles that can affect the driving or parking of the vehicle 1.

On the other hand, when it is determined that there is no access to the vehicle 1 of the external obstacle or contact between the vehicle 1 and the external obstacle, the controller 600 may continuously control the vehicle 1 according to the second setting value.

When it is determined that the external obstacle approaches the vehicle 1 or the contact between the vehicle 1 and the external obstacle occurs, the controller 600 may determine the type of the external obstacle and control the brake device 700 or the driving device 800 so that the vehicle 1 stops or decelerates (6206, 6207). When it is determined that the external obstacle is the speed bump, the controller 600 may control the brake device 700 or the driving device 800 to decelerate the vehicle 1. However, this is only a form of the disclosure, and braking or deceleration control may be performed according to the factors that can affect the safety of the vehicle 1.

Figure 5:
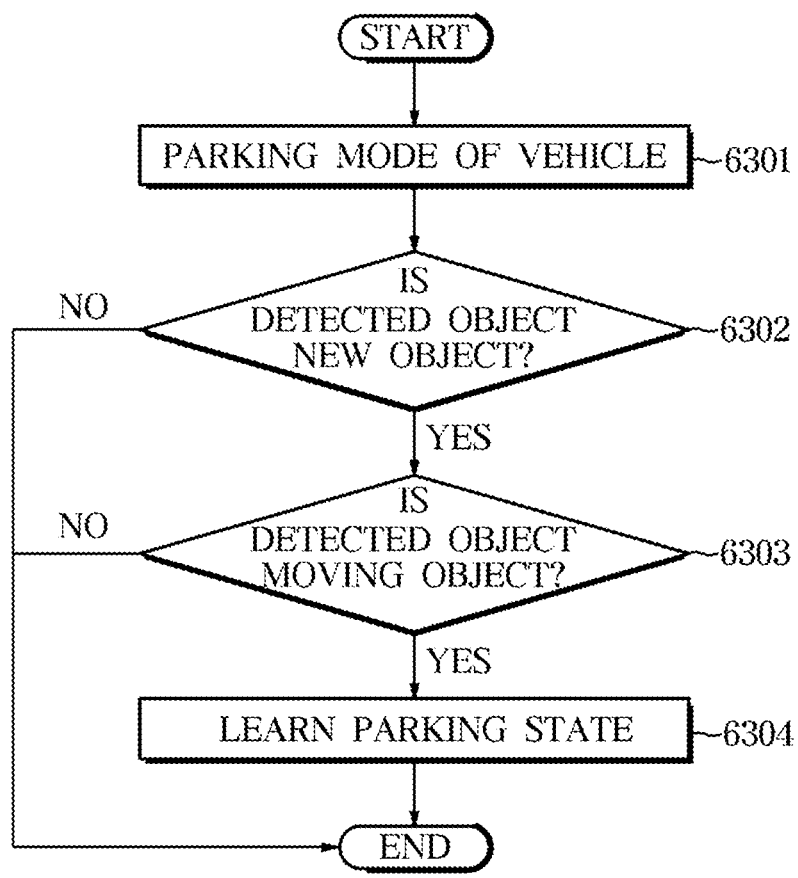
FIG. 5 is a view illustrating an example in which a controller learns a parking state in one form of the disclosure.

FIG. 5 is a view illustrating an example in which a controller learns a parking state in some forms of the disclosure.

Referring to FIG. 5, the controller 600 may learn the parking state based on the type of the detected object when the vehicle 1 is in the parking mode (6301).

In detail, the controller 600 may determine whether the object detected by the detector 600 is a newly detected object in the parking state of the vehicle 1 (6302).

When it is determined that the detected object is a new object instead of the previously detected object, the controller 600 may determine whether the detected object is the moving object (6303). However, when it is determined that the detected object is the same object as the previously detected object, the controller 600 may terminate the parking state learning. Here, in order to determine whether the detected object is the same object as the previously detected object, the controller 600 may determine not only the physical identity of the object but also the actual identity of the object based on whether the object is the same type.

When it is determined that the detected object is the moving object, the controller 600 may classify the object as a movable object and learn it (6304). In addition, when it is determined that the detected object is an object which cannot be moved, the controller 600 may determine the object as the stationary object and learn it.

On the other hand, the learning of the controller 600 may be made by deep learning by an artificial neural network, the controller 600 may store and learn the algorithm for learning the parking state of the vehicle.

Figure 6:
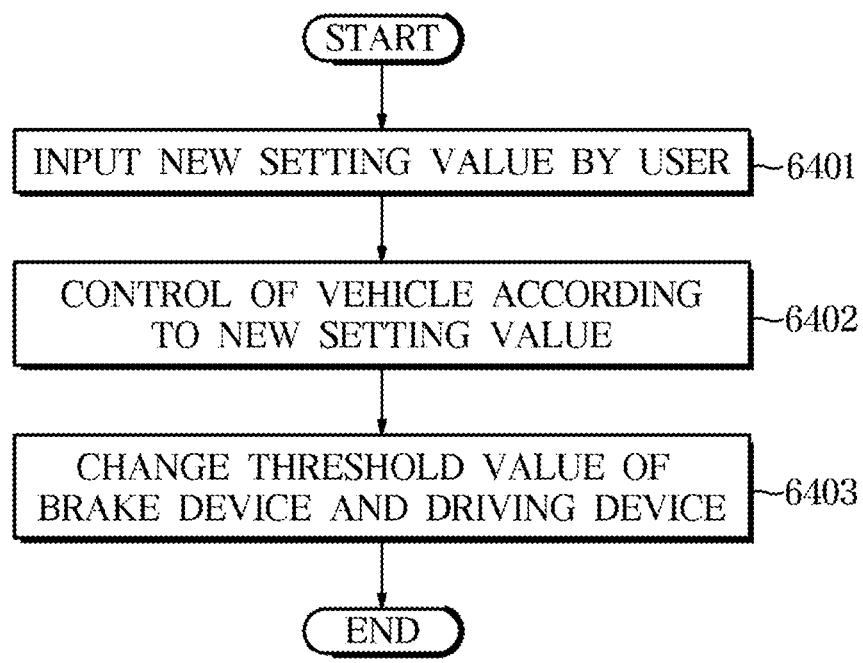
FIG. 6 is a view illustrating an example of changing a setting value in one form of the disclosure.

FIG. 6 illustrates a process in which the inputter 400 receives a change value of at least one of the preset first setting value or the second setting value, and the controller 600 controls the vehicle 1 based on the input setting value.

In detail, the user may input at least one of the first setting value and the second setting value to the inputter 400 (6401).

When a new setting value is input, the controller 600 may perform the control of the vehicle 1 based on the input new setting value (6402). Here, the new first setting value or second setting value may be set according to the user definition based on the driving ability of the user or the sensitivity of the driving device 800 or the brake device 700.

Particularly, when it is determined that the new setting value is input, the controller 600 may change the first setting value or the second setting value for controlling the brake device 700 or the driving device 800, and compare the changed first setting value and second with the relative acceleration of the object with respect to the vehicle 1 (6403).

Figure 7:
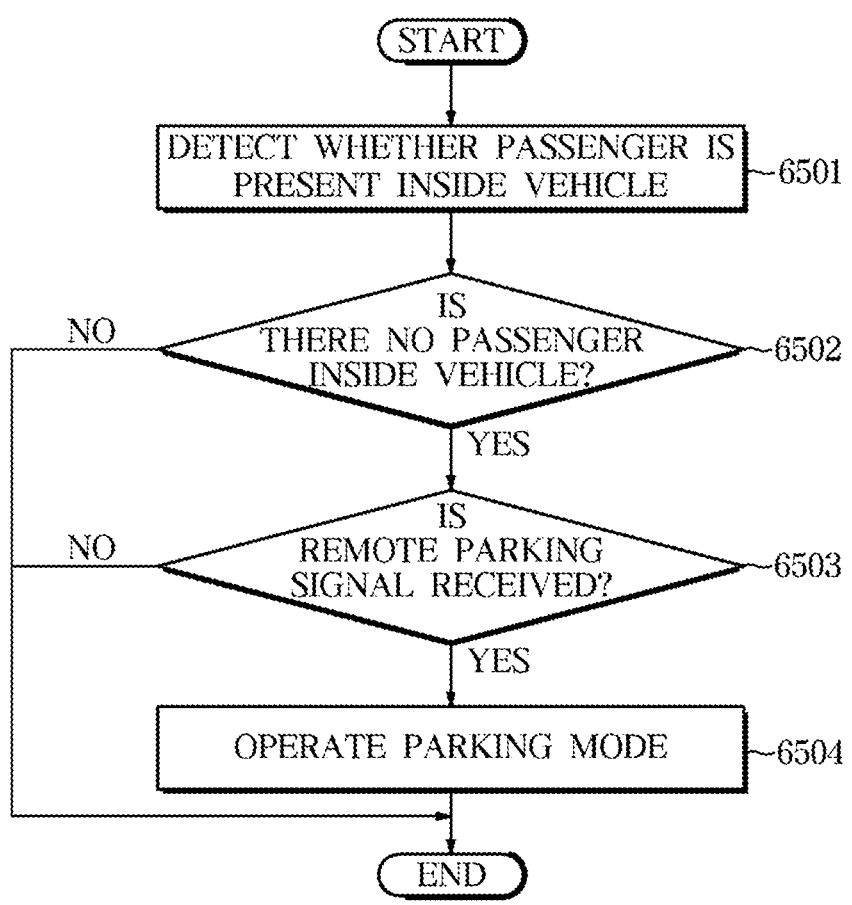
FIG. 7 is a view illustrating a process of controlling a vehicle according to whether a controller exists in one form of the disclosure.

FIG. 7 is a flowchart illustrating a process in which the controller 600 operates the parking mode of the vehicle 1 based on whether the passenger exists in the vehicle 1.

In detail, the sensor device 500 may detect whether the passenger is present in the vehicle 1 and transmit the detection result to the controller 600 (6501).

The controller 600 may determine whether the passenger is present in the vehicle 1 based on the detection result of the sensor device 500 (6502).

When it is determined that no the passenger is present in the vehicle 1, the controller 600 may determine whether the automatic parking signal is received by the communicator 200 (6503). However, when it is determined that the passenger is present in the vehicle 1, the controller 600 may terminate the control of the vehicle 1 without operating the parking mode.

When it is determined that the automatic parking signal is received by the communicator 200, the controller 600 may operate the parking mode of the vehicle 1 (6504). However, when it is determined that the automatic parking signal is not received by the communicator 200, the controller 600 may not operate the vehicle 1 the parking mode.

However, this assumes an automatic parking state, and when the user manually operates the parking mode, the controller 600 may operate the parking mode regardless of whether or not the automatic parking signal is received.

As is apparent from the above description, the forms of the disclosure may be divided into the normal driving state and the parking state, and when the vehicle is determined to be in the parking state, the relative acceleration of the object and the vehicle may be determined more finely than in the normal driving state.

The disclosed forms of the present disclosure may have effect of reducing a risk of contact accident while parking by detecting and determining the relative acceleration between the vehicle and surrounding objects in the parking mode finer than a the case of a normal driving.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
    a brake device;
    a memory having a first setting value and a second setting value stored therein, the second setting value having a smaller magnitude than the first setting value;
    a first sensor;
    a second sensor; and
    a controller configured to:
        determine whether the vehicle is in a parking state or a normal driving state that is not a parking state;
        receive information from the first sensor related to the presence of an object;
        receive information from the second sensor related to whether a passenger is present in the vehicle;
        determine whether an automatic parking signal has been received when it is determined that no the passenger is present in the vehicle;
        when the vehicle is in the normal driving state, compare the first setting value and a relative acceleration magnitude of the object with respect to the vehicle and control the brake device based on a result of comparing the first setting value and the relative acceleration magnitude; and
        when the vehicle is in the parking state, compare the second setting value and the relative acceleration magnitude of the object with respect to the vehicle and control the brake device based on a result of comparing the second setting value and the relative acceleration magnitude;
    wherein the first setting value stored in the memory is a first relative acceleration threshold value of the object with respect to the vehicle when the vehicle is in the normal driving state; and
    wherein the second setting value stored in the memory is a second relative acceleration threshold value of the object with respect to the vehicle when the vehicle is in the parking state.

2. The vehicle according to claim 1, wherein the controller is configured to control the brake device based on whether the object approaches the vehicle.

3. The vehicle according to claim 1, wherein the controller is configured to:
    determine whether the object approaches a tire of the vehicle; and
    control the brake device based on whether the object approaches the tire of the vehicle.

4. The vehicle according to claim 3, wherein the controller is configured to:
    determine whether the object is in contact with the tire of the vehicle; and
    control the brake device and a driving device based on whether the object is in contact with the tire of the vehicle.

5. The vehicle according to claim 1, wherein the vehicle further comprises an airbag control unit (ACU), wherein the controller is further configured to control a driving device and the brake device based on the information received from the first sensor.

6. The vehicle according to claim 1, wherein the vehicle further comprises:
    an input device configured to receive at least one of the first setting value or the second setting value,
    wherein the controller is configured to control at least one of a driving device or the brake device based on the first setting value or the second setting value.

7. The vehicle according to claim 1, wherein the controller is configured to learn the parking state of the vehicle by a deep learning.

8. A method of controlling a vehicle comprising:
    operating the vehicle in a parking state or a normal driving state that is not a parking state;
    detecting the presence of an object when operating the vehicle;
    detecting whether a passenger is present in the vehicle;
    when in the normal driving state, comparing a first setting value and a relative acceleration magnitude of the object with respect to the vehicle and controlling a brake device of the vehicle based on a result of comparing the first setting value and the relative acceleration magnitude of the object;
    determining whether an automatic parking signal is received when it is determined that no passenger is present in the vehicle; and
    when in the parking state, comparing a second setting value and the relative acceleration magnitude of the object with respect to the vehicle when in the parking state and controlling the brake device based on a result of comparing the second setting value and the relative acceleration magnitude of the object;
    wherein the first setting value is a first relative acceleration threshold value of the object with respect to the vehicle when the vehicle is in the normal driving state;
    wherein the second setting value is a second relative acceleration threshold value of the object with respect to the vehicle when the vehicle is in the parking state; and
    wherein the second setting value has a smaller magnitude than the first setting value.

9. The method according to claim 8, wherein controlling the brake device further comprises controlling the brake device based on whether the object is in contact with the vehicle.

10. The method according to claim 8, wherein controlling the brake device further comprises:

determining whether the object approaches a tire of the vehicle; and controlling the brake device based on whether the object approaches the tire of the vehicle.

11. The method according to claim 10, wherein controlling the brake device further comprises:

determining whether the object is in contact with the tire of the vehicle; and controlling the brake device and a driving device based on whether the object is in contact with the tire of the vehicle.

12. The method according to claim 8, wherein controlling the brake device further comprises controlling a driving device and the brake device.

13. The method according to claim 8, further comprising:

receiving at least one of the first setting value or the second setting value; and controlling at least one of a driving device or the brake device based on the first setting value or the second setting value.

14. The method according to claim 8, wherein controlling the brake device further comprises learning the parking state of the vehicle by a deep learning.

15. A vehicle comprising:

a brake device;

an airbag control unit;

a memory having a first setting value and a second setting value stored therein, the second setting value having a smaller magnitude than the first setting value;

a first sensor;

a second sensor; and a controller configured to:

receive information from the first sensor related to the presence of an object;

receive information from the second sensor related to whether a passenger is present in the vehicle;

determine whether the vehicle is in a parking state or a normal driving state that is not a parking state;

determine whether an automatic parking signal has been received when it is determined that no passenger is present in the vehicle;

when the vehicle is in the normal driving state, compare the first setting value and a relative acceleration magnitude of the object with respect to the vehicle and control the brake device based on a result of comparing the first setting value and the relative acceleration magnitude;

when the vehicle is in the parking state, compare the second setting value and the relative acceleration magnitude of the object with respect to the vehicle and control the brake device based on a result of comparing the second setting value and the relative acceleration magnitude; and wherein the first setting value stored in the memory is a first relative acceleration threshold value of the object with respect to the vehicle when the vehicle is in the normal driving state; and wherein the second setting value stored in the memory is a second relative acceleration threshold value of the object with respect to the vehicle when the vehicle is in the parking state.

16. The vehicle according to claim 15, wherein the first sensor is included in the airbag control unit.

17. The vehicle according to claim 15, wherein the controller is configured to control the brake device based on whether the object approaches the vehicle.

18. The vehicle according to claim 15, wherein the controller is configured to:

determine whether the object approaches a tire of the vehicle; and control the brake device based on whether the object approaches the tire of the vehicle.

19. The vehicle according to claim 18, wherein the controller is configured to:

determine whether the object is in contact with the tire of the vehicle; and control the brake device and a driving device based on whether the object is in contact with the tire of the vehicle.

20. The vehicle according to claim 15, wherein the controller is configured to learn the parking state of the vehicle by a deep learning.

* * * * *